Oct. 19, 1965   R. B. SPECHT ETAL   3,212,651
MANIPULATOR
Filed June 12, 1962   6 Sheets-Sheet 4
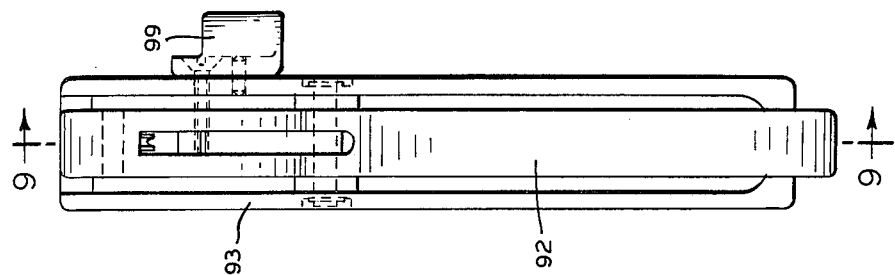
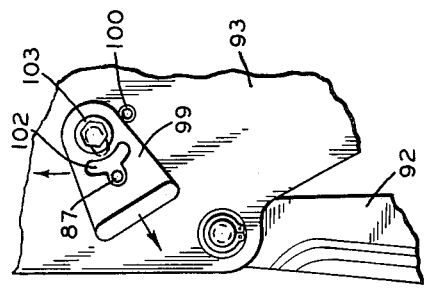
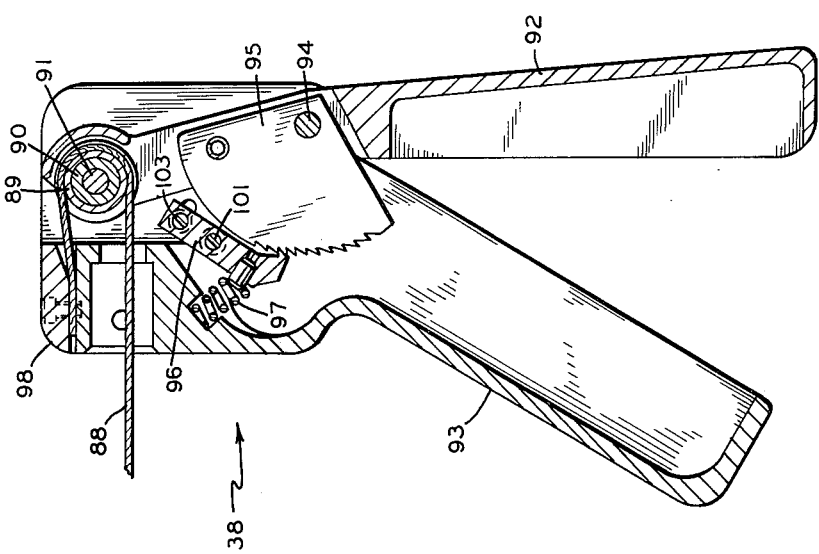
INVENTORS.
RALPH B. SPECHT
PETER T. CALABRETTA
BY
Arthur J. Plantamura
ATTORNEY.

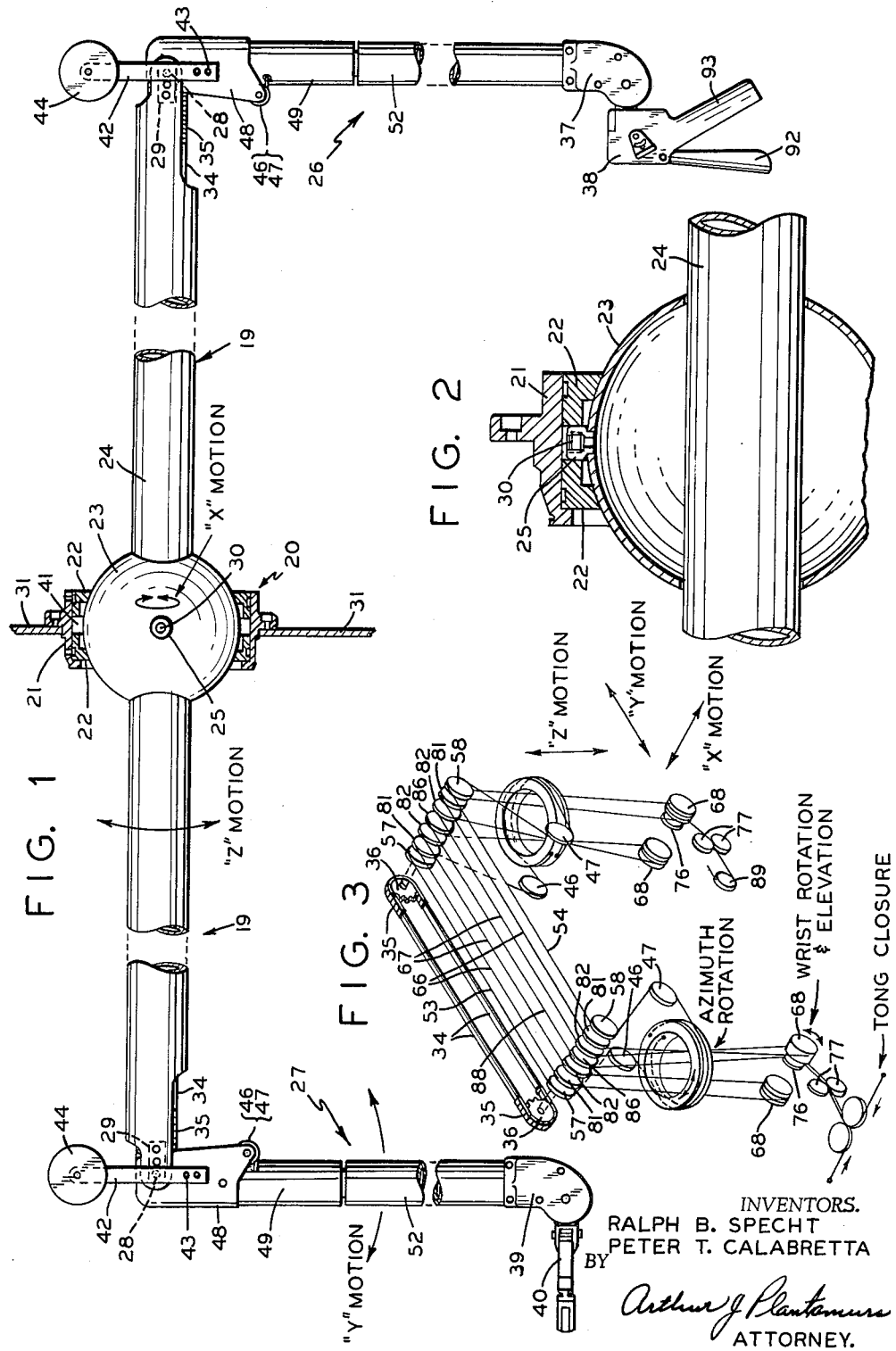

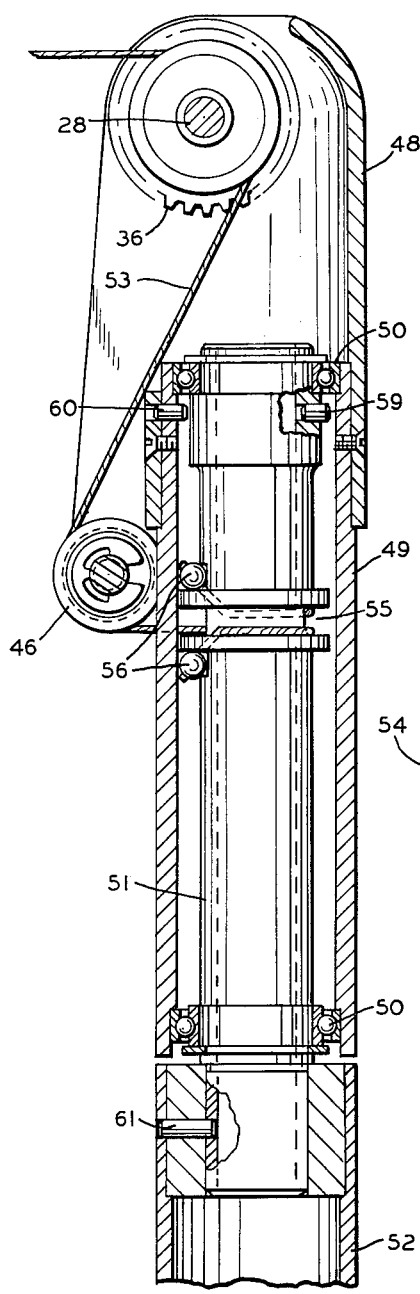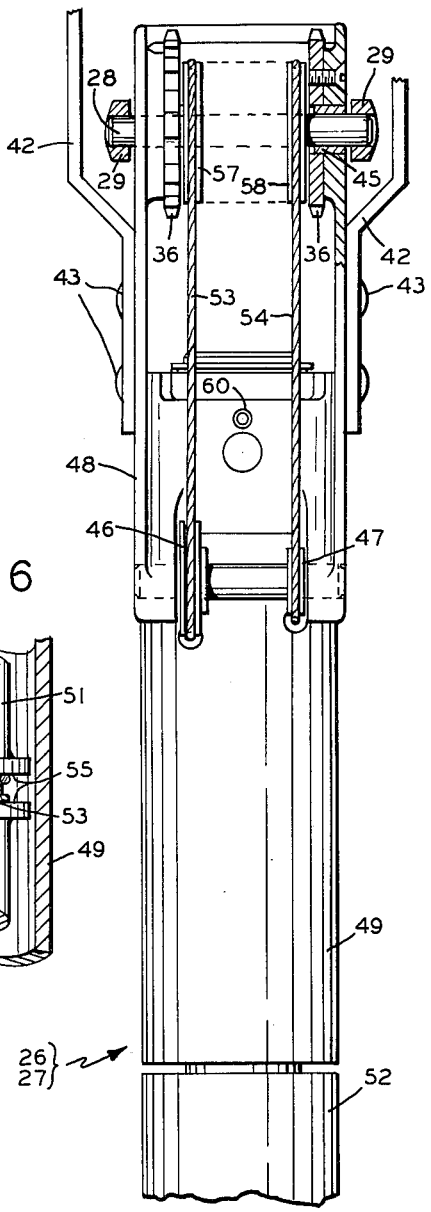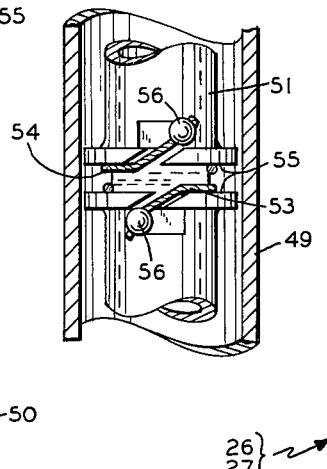

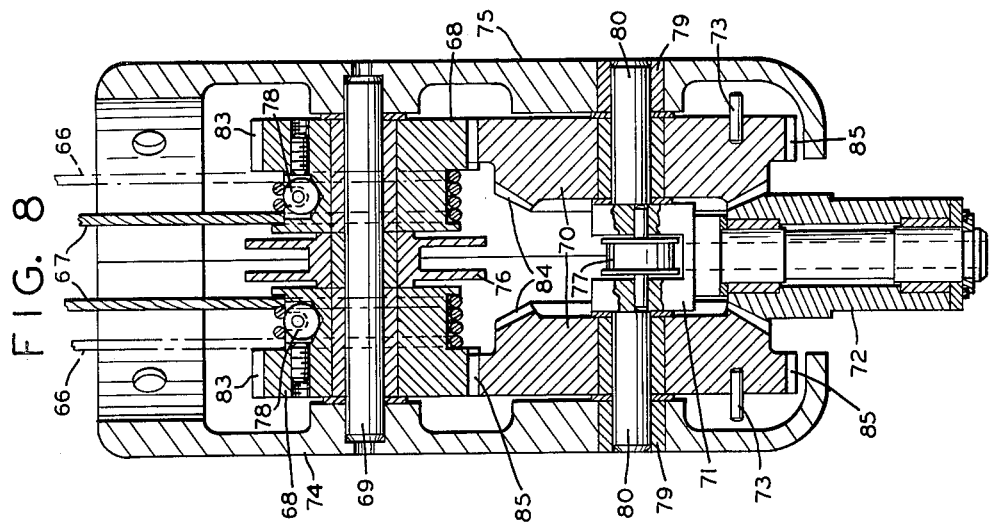
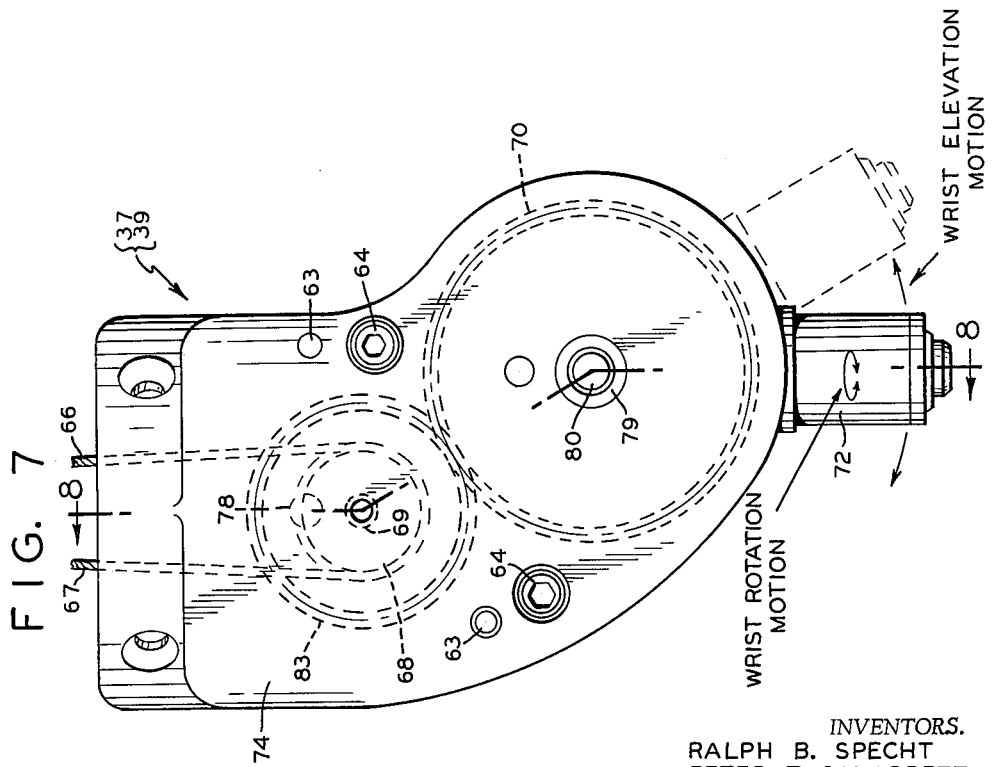

Oct. 19, 1965 R. B. SPECHT ETAL 3,212,651
MANIPULATOR

Filed June 12, 1962 6 Sheets-Sheet 5

INVENTORS.
RALPH B. SPECHT
PETER T. CALABRETTA
BY

ATTORNEY.

United States Patent Office 3,212,651
Patented Oct. 19, 1965

1

3,212,651
MANIPULATOR
Ralph B. Specht, Byram, Conn., and Peter T. Calabretta, Port Chester, N.Y., assignors to American Machine & Foundry Company, a corporation of New Jersey
Filed June 12, 1962, Ser. No. 201,971
11 Claims. (Cl. 214—1)

This invention relates to remote control manipulators or mechanical arms which are employed for the purpose of manipulating articles at a position remote from the operator. In particular, the invention relates to an improved manipulator in which substantial simplification is effected over manipulators of the type available commercially and described, for example, in U.S. Patent 2,764,301.

In the remote handling equipment art there is a definite demand for a relatively light duty, inexpensive, yet dexterous and dependable device for manipulating articles at a location isolated from the operator. In comparison to the manipulator of the kind to which the invention is directed, units of the type described in U.S. Patent 2,764,301 are of substantially greater bulk, weight, and complexity, and are so costly that as a practical matter their use is ruled out for applications otherwise making devices of this character attractive. The market for light duty remote handling apparatus, as a consequence, has resorted to a variety of tong devices generally of the over-the-wall type which although significantly simplified in construction, leave much to be desired because of cumbersomeness, inadequacy, and lack of dexterity in operation. One such device of the prior art is disclosed, for example, in U.S. Patent 2,632,574.

The design of remote control manipulators of the kind described in U.S. Patent 2,764,301 and now in commercial use, is such that appreciable reduction in size is difficult. Consequently, it has not been practical to adapt units of that kind for use in limited volume work areas. Existing manipulative devices for small volume applications such as the ball and socket or Castle types have a severely limited application and lack the wide range of movement provided by the mechanical device contributed by the present invention.

The relatively light duty mechanical manipulator herein described overcomes the restrictions heretofore inherent in the devices of the character described in U.S. Patent 2,764,301; it possesses all the essential characteristics while eliminating much of the cost and mechanical complexity of devices of that type.

The present invention provides an operator with seven degrees, or directions, of motion freedom, as is conventional in master-slave manipulators. The present invention in essence alters and considerably simplifies the mechanism heretofore necessary to provide these motions. In lieu of the mechanism which provides vertical movement of the arms utilized in the prior art, the invention employs fixed arms with a polarized mounting of the horizontal member which joins the two arms. Polarization of the mounting is necessary for torque restraint not afforded by the unrestricted swivel action of a "universal" mounting, e.g. as with an unfettered ball mounting. The remote control device of the invention offers various additional features including simplification of arms, wrists and handle and a novel arrangement for rotation of the arms.

It is an object of the present invention to provide an improved remote control manipulator greatly simplified in construction which is relatively light in weight and has excellent dexterity while at the same time not detracting from the normal corresponding operations of manipulators available in more complicated prior art devices.

It is a further object of the invention to provide a manipulator that has arms of fixed length but affords means for movement of the arms in a substantially vertical as well as horizontal direction producing movement of the kind associated with conventional two piece arms supported on a horizontal member.

It is another object of the invention to provide a relatively light weight remote control manipulator of great versatility and dexterity which may be used in a through the wall mount as well as in an over a wall mount.

It is still a further object of the invention to provide a manipulator with an improved handle which is simplified in detail and has sustained gripping and reversible features.

Additional objects and advantages will become apparent from the specification and drawings in which:

FIG. 1 is an elevational view showing the manipulator mounted in a shielding wall.

FIG. 2 is an enlarged partial sectional view of a pivot joint for the horizontal support which permits movement of the arms in the X and Z directions.

FIG. 3 is a schematic perspective view illustrating the flexible linking connectors which permit movement of the arms in the Y direction as well as afford means for various grasping and twisting manipulations.

FIG. 4 is an enlarged elevational sectional view of the upper part of an arm encompassing the pivot joint and azimuth arrangement.

FIG. 5 is another elevational view of one of the symmetrical arms taken substantially from the inner side of the arm, i.e. showing the side of the arm facing the wall.

FIG. 6 is a partial elevational sectional view of the arm illustrating the azimuth cable connection.

FIG. 7 is a side elevational view of the wrist portion of the arm to which the tongs of the slave end, or the handle of the master end, is attached.

FIG. 8 is an elevational sectional view of the wrist taken substantially along line 8—8 of FIG. 7.

FIG. 9 is an elevational sectional view of the handle for the manipulator taken substantially along line 9—9 of FIG. 10.

FIG. 10 is a front elevational end view of the handle.

FIG. 11 is a fractional view of the handle illustrating the handle ratchet release mechanism.

Figure 12:
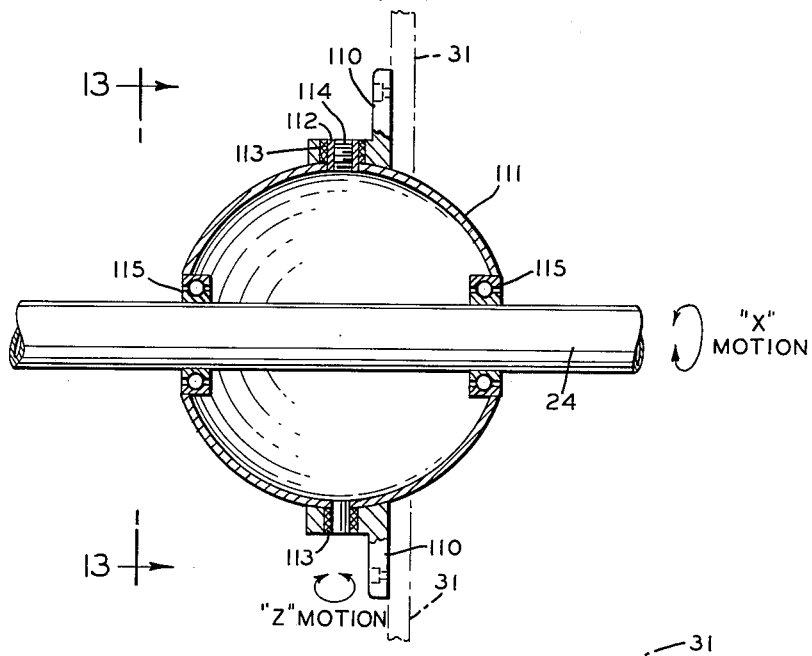
FIG. 12 is a plan view partially in section illustrating a modified arrangement of a polarized pivot support for the horizontal member.

By reference to the figures of the drawing and to the description which follows hereinbelow, it will be seen that the manipulator of the invention functions by the utilization of a polarized pivot support for the horizontal member to which the arms are pivotally connected; the polarized movement when combined with the other motions available, duplicates the usual seven degrees of motion freedom found in the master-slave type manipulators.

These motions available in the manipulator are:

(1) X motion—simultaneous side to side motion of the arms in a plane parallel to a barrier wall.

(2) Y motion—simultaneous back and forth motion of the arms in a plane perpendicular to a barrier wall.

(3) Z motion—reciprocating up and down motion of both arms pivotable about the horizontal support pivot mounting.

The arms remain parallel for all above-described motions.

(4) Azimuth rotation—simultaneous axial rotation of the rotatable portion of the arms.

(5) Wrist elevation—simultaneous angular upward or downward displacement of handle and tongs about wrist differential gear centers in the plane of both arms.

(6) Wrist rotation—simultaneous twisting motion of the handle and tongs axially about wrist differential pinion.

(7) Tong closure—squeezing action imparted to the tongs from the handle through connecting cable displacement.

This invention differs in one important respect from master-slave manipulators of the kinds described in U.S. Patent 2,764,301 in that the Z (up and down) motion is a reciprocating action rather than having as a feature the simultaneous up and down motion of master and slave telescoping tubes designated as movable parts 57 and 60, respectively, in that patent.

Referring to the figures of the drawing, the manipulator of the invention comprises, in general, a horizontal support 19, a mount 20 for the support, and master and slave arms 26 and 27, respectively. While the support 19 is illustrated in a horizontal direction, a position in which it is generally utilized, it will be apparent that its disposition in a vertical or diagonal position is not precluded.

Mounting of the manipulator at a suitable height for either a standing or sitting position is accomplished by fastening through suitable mounting means, the ball housing 21, to any barrier wall 31. This mounting may be a through the wall type as shown or it may be employed in a top of the wall mounting utilizing adapters suitably constructed according to techniques known to those skilled in the art to effectuate this purpose. In a top of the wall arrangement, a suitable trolley may be devised to permit transverse motion along the length of any barrier wall if that movement is desirable.

Within the ball housing 21 are fastened a pair of ball races 22 (FIGS. 1 and 2), which are assembled with a fixed space between them. The races 22 are constructed and arranged to provide, in effect, a circular groove 41 within the ball housing. The groove 41 is disposed around the periphery of the spherical ball 23. The ball races 22 provide a bearing surface for the ball 23 which is secured in any suitable manner to the thru-tube 24 of the horizontal support 19, e.g., as by silver braze or other fastening arrangement. Guide or pivot pins 25 are also secured as by brazing to the ball 23. This arrangement permits the ball 23 and the horizontal support or thru-tube 24 to have unlimited rotation within the ball housing 21. The pivot pins 25 are also rotatable within the circular groove 41 established by the races 22. This motion of the pins 25 as they traverse the path of groove 41 is the X motion as illustrated by arrows in FIGS. 1 and 3. For any angular rotated position of the ball assembly, and pins 23, 24 and 25, respectively, in the plane of the groove 41, the support 24 is free to pivot in a plane perpendicular to the groove 41 by displacement about the axis of the guide pins 25. The angular displacement of the horizontal tube 24 about the pins 25 is limited when the thru-tube 24 contacts the ball races 22. This motion, known as the Z motion, is "polarized" by establishing two points or poles of rotation (i.e. pivot pins 25) to effect controlled reciprocating action of the thru-tube 24. The guide pins 25 thus provide the necessary torque restraint for exerting a force at the tongs 40. In the absence of restraint on the mounting for the horizontal support 19 the manipulator is rendered substantially uncontrollable when transferring articles from one position to another in a plane which is substantially horizontal. In other words, without this polarization of the ball 23, the coupling effect of forces between the master arm 26 and the slave arm 27 would cause swiveling about the ball 23 in effect preventing the application of any torque at the tongs 40 in a plane parallel to the X motion. The term "polarize," or "polarization," is employed herein to designate the restricted movement of the horizontal support 19 as controlled by the pivot mounting 20. Set screws 30 arranged to be removable from the guide pins 25, permit filling the hollow ball with lead shielding when this is desirable for nuclear applications. Alternately other materials of construction may be used, e.g., the entire mounting 20 may comprise lead or plastic. Additionally, shielding may be effected by appropriately introducing elements of dense materials, e.g., the ball races may be constructed of lead and lead plugs with suitable openings may be positioned within the tube 24. Also, the unit may be supplied with booting for alpha sealing corrosion and contamination protection utilizing materials and techniques known in the art for this purpose.

At the extremes of the thru-tube 24, FIG. 1 are mounted the master arm 26 and the slave arm 27 which are identical except for being mounted back to back, i.e. with azimuth pulleys 46 and 47 of each arm facing each other. Each arm pivots (in Y motion) about a shaft 28 set in a pair of mounting blocks 29. The motion perpendicular to the barrier wall 31, or Y motion of the arms 26 and 27 in the vertical plane of the thru-tube 24 is accomplished by suitable connecting cables or as shown by four tie rods 34; each of two pairs of rods 34 linking the arms through chain segments 35 which are strung over two sprockets 36 (FIGS. 4 and 5) fixed to each of the arms. Angular motion of the master arm 26 about the pivot pin 28 causes a duplicated parallel displacement of the slave arm 27 about a similar pivot pin 28 through a linear displacement of the tie rods 34 which causes a rotation of the chain segments 35 about sprockets 36. It will be apparent that where the invention utilizes tie rods 34 in combination with chain segments 35 and sprockets 36, a chain may be used for the entire length or in lieu thereof a cable or tape. Forming a part of the master arm 26, to effect a reproduction of the manipulations of an operator, are the wrist 37 and the handle 38 which will be described more fully hereinafter. Motions imparted to the handle are transmitted through the machine by suitable connections such as cables or tapes (in combination with rods 34 and chain 35) to the slave arm 27, slave wrist 39 and grippers or tongs 40. The word tongs is used herein to designate the grasping means 40 situated at the terminal end of the slave arm and is used interchangeably with "grasper" or "gripper."

To provide counterbalancing of the weight of the arms 26 and 27 for movements in both X and Y directions, suitable weights may be conveniently employed and suitably located in various ways known in the art. For this purpose as shown in FIG. 1 and partially illustrated in FIG. 5 counterweight brackets 42 are appropriately secured at 43 supporting weights 44.

By reference to FIG. 4 in conjunction with FIG. 1, the connecting means between the wrist 37 and handle 38 of the master arm 26 and the consequential reproduced movement in the wrist and tongs 39 and 40, respectively, of the slave arm 27 is described.

The arm pivot housing 48 is pivotable on shaft 28 in bearings 45 (FIG. 5). Secured to housing 48 by suitable means are upper and lower ball bearing units 50 which are connected for coordinate movement with inner azimuth tube 51 and which support and retain the azimuth tube 51 in appropriate relationship. Secured to the azimuth tube 51 with dowel pins 61 or other conventional fastening means is the arm boom tube 52. The linking means to the tube 52, i.e. the means integrating the wrist 37 and handle 38 into the master arm 26 and the wrist 39 and tongs 40 into the slave arm 27 are shown in FIG. 1.

Azimuth rotation in the manipulator of the present invention is accomplished through the arm tube 52, inner tube 51 and ball bearing units 50 thereby effecting a simplified and less costly structure for this motion than in the conventional means which is described in U.S. Patent 2,764,301. The movable parts 57 and 60 in that patent are completely eliminated in the structure of the invention for example. In the manipulator of this invention, as distinguished from the arrangement of the foregoing patent in which rotation is substantially at the lower end of the fixed arm, rotation is accomplished in the upper area of the master arm and the slave arms 26 and 27, respectively.

As shown in FIG. 4, rotation of arm boom tube 52 of the master arm 26 will cause the azimuth tube 51, to which tube 52 is attached, to rotate within the bearing units 50. This rotation causes a displacement of the azimuth cables 53 and 54. Depending on the direction of rotation, cables 53 and 54 will tend to wrap on, or unwrap from, the azimuth tube groove 55 in equal increments, effecting corresponding movement in the slave arm. Swaged terminal fastening balls 56 (other suitable connecting means may be utilized) secure the cables 53 and 54 to the azimuth tube 51. Rotation of tube 51 is effected through cables 53 and 54. The motion of the cable 53 is transmitted from the master end to the slave azimuth assembly by stringing this cable over pulleys 46 and 57 on the left, and similarly by stringing the cable 54 over pulleys 47 and 58 on the right.

Stop pin 59 secured in the azimuth tube 51 serves to limit arm boom tube 52 rotation by striking limit pin 60 at approximately 180° rotation to prevent fouling of either cable 53 or 54 which could occur where unlimited rotation were permitted.

FIGS. 7 and 8 serve to show the wrist assembly devised for this invention with the object of reducing complexity and manufacturing costs over the conventional wrist designs. Wrist cables 66 and 67 connect the master wrist 37 with the slave wrist 39 of similar construction. These cables impart rotation to the wrist cable drum 68 and attached gear 83, then to gear 85 and attached differential gear 84, then to the differential pinion 72 such that an elevation or rotation motion of the handle 38 will be similarly transmitted to the tongs 40. The handle 38 and tongs 40 are suitably secured to the differential pinions 72 as by set screws.

As seen from FIGS. 7 and 8, a wrist rotation or wrist elevation motion imparted to the differential pinion 72 will be transmitted to the cables 66 and 67. As distinguished from the arrangement presented in U.S. Patent 2,764,301, the structural arrangement of the wrist is substantially simplified. In wrist elevation motion, the differential pinion 72 supported by the yoke 71 is rotated about shafts 80 which in turn rotate on a pair of bushings 79. Side gears 70 connected through gear teeth 84 and 85 rotate about the shafts 80 which are fastened to the yoke 71. This rotation through gear teeth 84 and 85 will cause drum 68 through gear teeth 83 to rotate about shaft 69. The swaged terminal balls 78, affixed to cable 66 and 67, will transmit the torque imparted to the cable drums 68 to the cable. The wrapping or unwrapping of cables 66 and 67, depending on the direction of rotation, will be transmitted to the similar wrist cable drum 68 at the opposite end of the manipulator over similar pulleys 81 and 82, respectively, as shown in FIG. 3. In wrist rotation, the interaction of the wrist cables is such that a rotation of the differential pinion 72 will cause the differential side gears 70 to rotate in opposite directions. This movement in turn causes the cable drums 68 to rotate in opposite directions. The effective cable displacement will be equal and opposite and this motion will be similarly transmitted to the opposite wrist assembly.

The handle 38 (FIG. 1) of this invention, which through a cable, or similar linking means, causes the closure of the tongs 40, operates in a conventional manner by displacing the tong cable 88 (see FIGS. 3 and 9). however, the invention utilizes a novel fixed hand grip 93 and pivotable trigger 92 comprising an arrangement which is considerably simplified over known structures.

In the handle 38, as shown in FIGS. 9, 10 and 11, the handle body 93 is grasped by the hand of the operator with fingers wrapping around the trigger 92. The squeezing of the operator's hand causes the trigger 92 to pivot about the pin 94. Pulley 89 assembled to bushing 90 and rotatable about shaft 91 also pivots through an arc about pin 94. Since the end of cable 88 is suitably clamped to body 93 as by cable clamp 98, the entire length of cable 88 is in effect displaced sufficiently to cause a closure of the tongs 40 (FIG. 1). It should be noted that the cable 88 displacement in the tongs 40 is in the ratio of 2:1 with respect to the linear displacement of the pulley 89, since the cable is fixed on the body 93 by cable clamp 98.

A ratchet and pawl locking arrangement permits positioning of the cable pulley 89 such that an intermediate cable displacement can be obtained and maintained even as the operator relaxes his grip. Ratchet 95 is fixed to the trigger 92 and can simultaneously, with the pulley 89, pivot about pin 94. During angular displacement of the trigger 92, the ratchet 95 displaces pawl 96 which is pivotable about pin 101. The pawl 96 is kept in contact with the ratchet 95 through the force provided by spring 97. Since the tooth of the pawl 96 is always in engagement with one of the ratchet teeth, the tension in cable 88 cannot return the trigger 92 to the neutral position until the pawl is disengaged from ratchet 95.

Release of the pawl 96 from its locked position is accomplished by a linear displacement of the lockout tab 99 which is linked to the pawl by means of screw 103. This displacement causes the pawl 96 to disengage itself from the ratchet 95 by pivoting about shaft 101. As a result, the tension on cable 88 returns the trigger to the neutral or relaxed position which simultaneously causes the tongs 40 (FIG. 1) to return to the open position.

Complete disengagement of the pawl 96 is accomplished as desired by a linear displacement of lock-out tab 99 coupled with a rotational displacement. This arrangement allows selector pin 87 to rest within either sector of the circular slot 102 and permits optional gripping and relaxing reaction in the tongs co-extensive with the operator's hand actuation as distinguished from the holding means offered by the ratchet and pawl, 95 and 96, respectively.

Removal of screw 103, lock-out tab 99, selector pin 100 and their replacement on the opposite side of the handle body 93 permit the convenience of use for left handed operation of the ratchet 95 and pawl 96 system.

Figure 13:
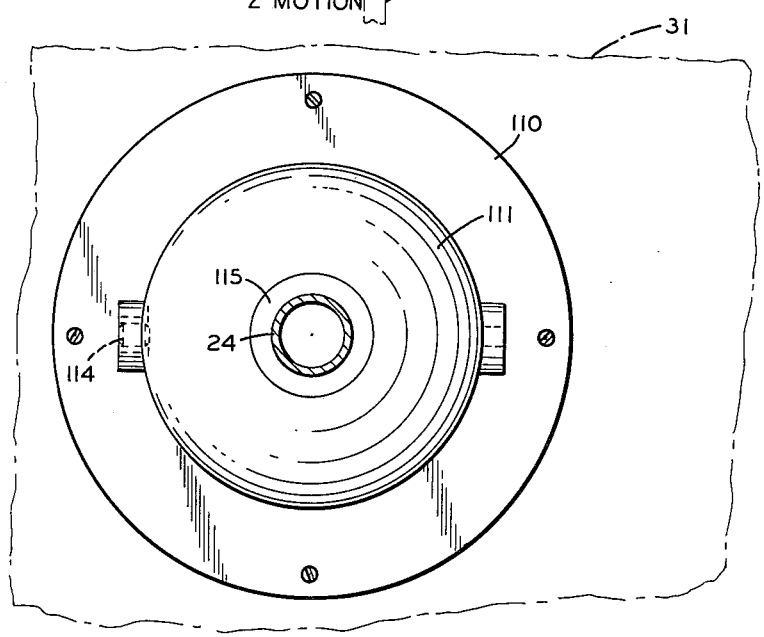
FIG. 13 is a view of the modified pivot support taken substantially along line 13—13 of FIG. 12.

As an alternate to the ball mounting 20 (illustrated in FIG. 1 and more detailed in FIG. 2) is the arrangement shown in FIGS. 12 and 13. As seen in FIG. 12, the same motions can be effected as previously described for the mounting of FIGS. 1 and 2. In describing the configuration of FIGS. 12 and 13, like parts will be designated with the same numerals as in FIGS. 1 and 2. As shown, bearings 115 secured by suitable means to the ball 111 support the thru-tube 24. The thru-tube 24 is thus able to rotate about its horizontal axis providing unlimited X motion for the arms. Secured to the ball by suitable means are two diametrically opposite guide (or pivot) pins 112 freely rotatable in similar bushings 113 secured by suitable means in mounting flange 110 which may be secured to a barrier wall or an over the wall mount. This arrangement allowing pivotal movement on pins 112 permits Z movement which in FIG. 12 is substantially perpendicular to the plane of the drawing surface. Thus by manipulation of the master arm 26 (FIG. 1) through the handle 38, a reciprocating Z motion can be effected at the slave arm 27 and tongs 40 in a manner similar to that previously described.

Figure 14:
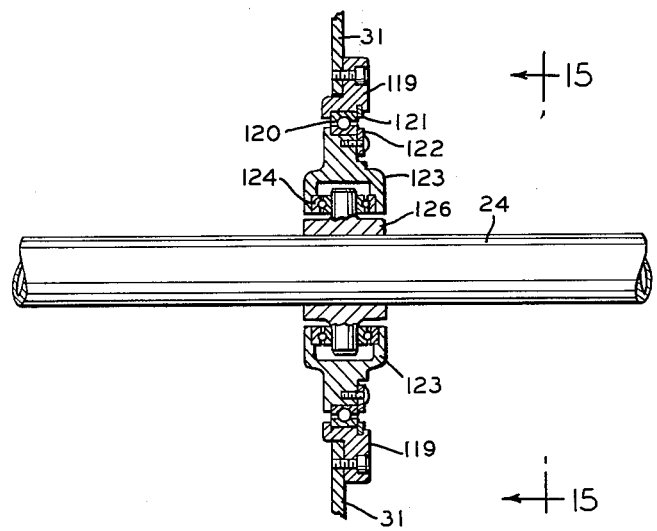
FIG. 14 is a plan view partially in section showing a mounting arrangement for the horizontal member.
Figure 15:
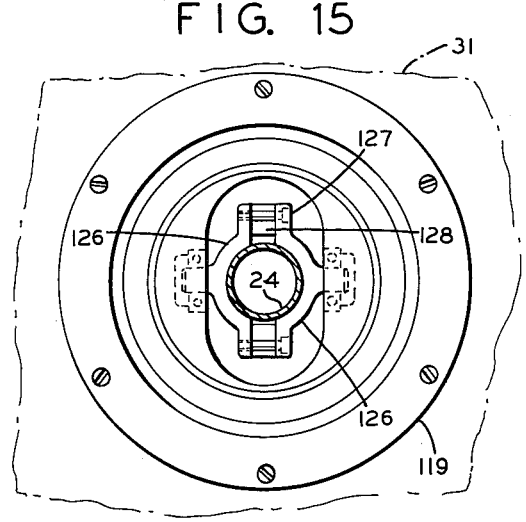
FIG. 15 is an end view of the modified mounting taken along line 15—15 of FIG. 14.

A still further alternate mounting to accomplish the same controlled X and Z motions previously described, is shown in FIGS. 14 and 15. In this configuration, a mounting flange 119 is appropriately secured to a barrier wall 31 which is arranged to contain a bearing 120 suitably retained as with retainer element 121. Secured to the inner race of bearing 120 by suitable means such as with element 122 is a bearing housing 123 which is unrestrictedly rotatable through bearing 120 to provide X motion for the arms, i.e. controlled rotation of support 24. Installed in bearing housing 123 are a pair of bearings 124 into which are assembled two similar thru-tube pivot segments 126. As shown in the embodiment of FIGS. 14 and 15, pivot segments 126 are first installed within bearing housing 123 and then suitably clamped to the thru-tube 24 using spacers 128 and bolts 127.

It is apparent from each of the various mountings for the horizontal support described herein that restriction of movement permitted by the mounting is important in order that effective control may be exercised at the master end over a load carried by the slave tongs.

It will be apparent to those skilled in the art that various modifications may be made in the invention without departing from the scope of the inventive concept. Accordingly, the invention is not to be limited except insofar as necessitated by the appended claims.

We claim:

1. A device for manipulating articles at a distance remote from the operator comprising: a support; a master arm of fixed length; a slave arm of fixed length, said arms pivotally connected to the respective ends of said support on a pivot axis which is transverse to the axis of said support; a wrist portion at the ends of said arms; a manual control element secured to the wrist portion of said master arm; gripping means secured to the wrist portion of said slave arm; a mount for said support situated intermediate the ends thereof, said mount comprising means intermediate the ends of the support permitting the support to rotate about is axis, means incorporated in said mount for restricting pivotal movement of said support with respect to the mount to polarized reciprocating action comprising a pivot which for any given pivoting movement of said support restricts the pivoting movement of the support to a plane perpendicular to the axis of the pivot in said mount; linking means connecting said arms and gripping means to provide coordinate twisting, gripping and pivotal movement of the gripping means, and corresponding parallel pivotal movement of the arms about their respective pivot points on said support.

2. A device for manipulating articles at a distance remote from the operator comprising: a support; a master arm of fixed length; a slave arm of fixed length, said arms pivotally connected to the respective ends of said support on a pivot axis which is transverse to the axis of said support; a wrist portion at the ends of said arms; a manual control element secured to the wrist portion of said master arm; gripping means secured to the wrist portion of said slave arm; a mount for said support situated intermediate the ends thereof, said mount comprising means intermediate the ends of the support permitting the support to rotate about its axis, means incorporated in said mount for restricting pivotal movement of said support with respect to the mount to polarized reciprocating action comprising a pivot which for any given pivoting movement of said support restricts the pivoting movement of the support to a plane perpendicular to the axis of the pivot in said mount; and linking means connecting said arms and gripping means to provide coordinate twisting, gripping and parallel pivotal movement of the arms about their respective pivot points on said support.

3. A remote control manipulator comprising: a horizontal support; a master arm of fixed length; a slave arm of fixed length, said arms pivotally connected to the respective ends of said support on a pivot axis which is transverse to the axis of said support; a wrist portion at the ends of said arms; a manual control element secured to the wrist portion of said master arm; gripping means secured to the wrist portion of said slave arm; a mount for said support situated intermediate the ends thereof, said mount comprising means intermediate the ends of the support permitting the support to rotate about its axis, means incorporaed in said mount for restricting pivotal movement of said support with respect to the mount to polarized reciprocating action comprising a pivot which for any given pivoting movement of said support restricts the pivoting movement of the support to a plane perpendicular to the axis of the pivot in said mount; linking means connecting said gripping means, and positioned internally in said wrist through said arms and horizontal support, to provide coordinate twisting, gripping and pivotal movement of the gripping means, and corresponding parallel pivotal movement of the arms about their respective pivot points on said support.

4. The manipulator of claim 2 wherein the mount for the horizontal support comprises a spherical coupling through which said support passes and which is affixed to said support.

5. A remote control manipulator comprising: a horizontal support; a mount for said support comprising means intermediate the ends of the support permitting the support to rotate about its longitudinal axis, means incorporated in said mount for restricting pivotal movement of said support with respect to the mount to polarized reciprocating action comprising a pivot which for any given pivoting movement of said supporting restricts the pivoting movement of the support to a plane perpendicular to the axis of the pivot in said mount; a master arm and a slave arm, each of said arms pivotally connected at one end to the respective ends of said support on a pivot axis which is transverse to the axis of said support; a wrist portion connected to the other end of each of said arms; a manual control element secured to the wrist portion of said master arm; gripping means secured to the wrist portion of said slave arm; an azimuth movement connection situated on said arms intermediate the ends of said arms; and flexible linking means, connecting said gripping means through said wrists, arms and horizontal support, to provide coordinate grasping, twisting and pivotal movement of the gripping means and corresponding parallel pivotal movement of the arms about their respective pivot points on said support.

6. The manipulator of claim 5 in which the azimuth connection is positioned on the arms contiguous to the pivotal connection thereof to the horizontal support.

7. A remote control manipulator comprising: a horizontal support; a master arm and a slave arm, said arms pivotally connected at one end to the respective ends of said support on a pivot axis which is transverse to the axis of said support; a wrist portion connected at the other end of each of said arms, a manual control element secured to the wrist portion of said master arm; gripping means secured to the wrist portion of said slave arm; an azimuth movement connection in said arms situated remotely from said wrist portions; a mount comprising means intermediate the ends of the support permitting the support to rotate about its axis, means incorporated in said mount for restricting pivotal movement of said support with respect to the mount to polarized reciprocating action comprising a pivot which for any given pivoting movement of said support restricts the pivoting movement of the support to a plane perpendicular to the axis of the pivot in said mount; flexible linking means connecting said gripping means internally through wrist portions, arms and horizontal support to provide coordinate grasping, twisting and pivotal movement of the gripping means, and corresponding parallel pivotal movement of the arms about their respective pivot points on said support.

8. The manipulator of claim 7 in which said mount comprises a spherical rotatable member, provided with a pair of pivot pins extending from opposite sides of said spherical member and a track in said mounting within which said pins are guided as said support is rotated in the X direction.

9. The device of claim 7 in which the gripping means secured to the wrist portion of said master arm comprises a handle unit which includes a pivotal trigger element and a rotatable pulley over which the linking means to afford gripping is carried, said pulley being mounted on and being pivotable with said trigger.

10. The device of claim 7 in which the gripping means secured to the wrist portion of said master arm comprises a handle unit which includes a pivotal trigger element a rotatable pulley over which the linking means to afford gripping is carried and a grip retaining ratchet, said pulley and ratchet being mounted on and being pivotable with said trigger.

11. A device for manipulating articles at a distance remote from the operator comprising: a support; a master arm of fixed length; a slave arm of fixed length, said arms pivotally connected to the respective ends of said support on a pivot axis which is transverse to the axis of said support; a wrist portion at the ends of said arms; a manual control element secured to the wrist portion of said master arm; gripping means secured to the wrist portion of said slave arm; a mount for said support situated intermediate the ends thereof, said mount comprising means intermediate the ends of the support permitting the support to rotate about its axis, means incorporated in said mount for restricting pivotal movement of said support with respect to the mount to polarized reciprocating action comprising a pivot which for any given pivoting movement of said support restricts the pivoting movement of the support to a plane perpendicular to the axis of the pivot in said mount; an arm counterbalance weight position on said support; and linking means connecting said arms and gripping means to provide coordinate twisting, gripping and pivotal movement of the gripping means, and corresponding parallel pivotal movement of the arms about their respective pivot points on said support.

References Cited by the Examiner

UNITED STATES PATENTS

| 2,595,134 | 4/52 | Gordon. |
| 2,632,574 | 3/53 | Goertz. |
| 2,764,301 | 9/56 | Goertz et al. |
| 3,031,090 | 4/62 | Stephenson. |

FOREIGN PATENTS

| 825,552 | 12/59 | Great Britain. |
| 874,104 | 8/61 | Great Britain. |

HUGO O. SCHULZ, *Primary Examiner.*